US009811496B2

United States Patent
Li et al.

(10) Patent No.: US 9,811,496 B2
(45) Date of Patent: Nov. 7, 2017

(54) METHOD AND APPARATUS FOR DETECTING INTERFACE CONNECTION BETWEEN DEVICES

(71) Applicant: Huawei Technologies Co., Ltd., Shenzhen (CN)

(72) Inventors: Yansong Li, Shenzhen (CN); Zhen Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 561 days.

(21) Appl. No.: 14/512,795

(22) Filed: Oct. 13, 2014

(65) Prior Publication Data

US 2015/0032405 A1    Jan. 29, 2015

Related U.S. Application Data

(63) Continuation of application No. PCT/CN2014/073250, filed on Mar. 11, 2014.

(30) Foreign Application Priority Data

Jul. 29, 2013    (CN) .......................... 2013 1 0323967

(51) Int. Cl.
*G06F 13/42*    (2006.01)
*H04L 29/06*    (2006.01)
*G01R 31/04*    (2006.01)

(52) U.S. Cl.
CPC .............. *G06F 13/42* (2013.01); *H04L 69/24* (2013.01)

(58) Field of Classification Search
None
See application file for complete search history.

(56) References Cited

U.S. PATENT DOCUMENTS 6,108,713 A * 8/2000 Sambamurthy ......... H04L 29/06
370/463
6,457,055 B1 * 9/2002 Hwong ............. H04L 12/40136
370/242
(Continued)

FOREIGN PATENT DOCUMENTS

CN    101350823 A    1/2009
CN    101494560 A    7/2009
(Continued)

OTHER PUBLICATIONS

Partial English Translation and Abstract of Chinese Patent Application No. CN103401728A, Oct. 28, 2014, 3 pages.
(Continued)

*Primary Examiner* — Eunsook Choi
(74) *Attorney, Agent, or Firm* — Conley Rose, P.C.

(57) ABSTRACT

A method for detecting an interface connection between devices is disclosed, including setting a recommended working parameter of a first interface as a first working parameter; obtaining, by using an auto negotiation operation, a second working parameter of a second interface; determining whether the second working parameter is equal to the first working parameter, and if the second working parameter is not equal to the first working parameter, sending an alarm to indicate that a connection is unmatched; if the second working parameter is equal to the first working parameter, setting the recommended working parameter of the first interface as a third working parameter, sending, by using the auto negotiation operation, the third working parameter to the second interface, and receiving the third working parameter sent by a second device through the second interface, so that the first interface communicates with the second interface by using the third working parameter.

19 Claims, 3 Drawing Sheets

(56) References Cited

U.S. PATENT DOCUMENTS

| | | | |
|---|---|---|---|
| 7,616,587 B1 | 11/2009 | Lo et al. | |
| 2003/0076832 A1* | 4/2003 | Ni | H04L 12/5601 370/395.1 |
| 2006/0039399 A1* | 2/2006 | Ejima | H04L 12/40136 370/445 |
| 2007/0274239 A1* | 11/2007 | Nguyen | H04L 49/3054 370/282 |
| 2009/0296735 A1 | 12/2009 | Cernius et al. | |
| 2012/0177360 A1* | 7/2012 | Uchida | H04L 41/06 398/1 |
| 2013/0301460 A1* | 11/2013 | Bugenhagen | H04L 12/66 370/252 |

FOREIGN PATENT DOCUMENTS

| | | | |
|---|---|---|---|
| CN | 103401728 A | 11/2013 | |
| EP | 2391061 A1 | 11/2011 | |

OTHER PUBLICATIONS

Foreign Communication From a Counterpart Application, PCT Application No. PCT/CN2014/073250, International Search Report dated Jun. 13, 2014, 7 pages.

Foreign Communication From a Counterpart Application, PCT Application No. PCT/CN2014/073250, Written Opinion dated Jun. 13, 2014, 5 pages.

Foreign Communication From a Counterpart Application, European Application No. 14766880.0, Extended European Search Report dated May 27, 2015, 7 pages.

\* cited by examiner

METHOD AND APPARATUS FOR DETECTING INTERFACE CONNECTION BETWEEN DEVICES

CROSS-REFERENCE TO RELATED APPLICATIONS

This application is a continuation of International Application No. PCT/CN2014/073250, filed on Mar. 11, 2014, which claims priority to Chinese Patent Application No. 201310323967.9, filed on Jul. 29, 2013, both of which are hereby incorporated by reference in their entireties.

TECHNICAL FIELD

The present invention relates to the field of computer and communications technologies, and in particular, to a method and an apparatus for detecting an interface connection between devices.

BACKGROUND

Figure 1:
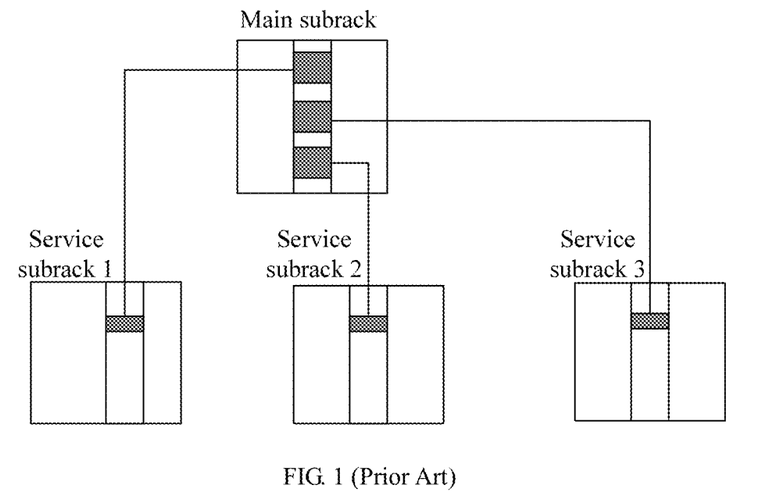
FIG. 1 is a schematic diagram of a scenario of an interconnection between communications device subracks in the prior art.

Communications devices often need to exchange information by interconnecting each other. As shown in FIG. 1, FIG. 1 shows a typical scenario of an interconnection between communications device subracks, where the communications device subracks include one main subrack and three service subracks (a service subrack 1, a service subrack 2, and a service subrack 3), each subrack has one switch board, and a switch board of a service subrack is connected to a switch board of a main subrack by using one Ethernet interface, so as to implement service convergence.

Allocation of an interface for an interconnection of communication devices often needs to comply with a certain rule, for example, one device must be connected to a specified interface of another device and cannot be arbitrarily connected to any one of a plurality of interfaces; or a plurality of interfaces of a device has different function definitions, for example, some interfaces are used to access signaling, some interfaces are used to access data, but mixed insertion is not allowed, otherwise, a normal service operation is affected. Besides a scenario where a fault easily occurs during initial installation, another scenario where a fault easily occurs is if a device is connected to many network cables, when the device fails, network cables need to be unplugged and then a new device is placed, and finally the network cables are plugged again, and in this case, network cables are also possibly connected in wrong positions. Under the two situations, a connection state of a network port (namely, a network port remains linked up) is not affected even if the network cables are connected in wrong positions and a problem is discovered only when a service starts to operate, but a basic reason is difficult to be recognized. As a result, a method for preventing mixed insertion of network cables is required.

To prevent a problem of mixed insertion of network cables, in a first prior art, a foolproof design is performed on a connector, so that mixed insertion is avoided by designing different shapes and structures of connectors. For example, a network port usually uses a RJ45 connector, a serial port usually uses a DB9 connector, and they are incompatible in shape. Therefore, mixed insertion may not occur. However, this manner is inapplicable to a case in which a device has a large number of interfaces of a same type.

Further, in a second prior art, a color matching design is performed on a connector and an electric cable, and mixed insertion is avoided by designing a same color for the connector and a matched electric cable. However, in this manner, many connectors and electric cables of a same type but of different colors are formed, and they are incompatible with each other, which increases a device cost.

In addition, in a third prior art, a connection relationship of different interfaces is instructed in a user manual, and meanwhile each interface name is marked on a device to distinguish network cables. However, the manner that wholly relies on a manual operation does not ensure accuracy of a connection.

SUMMARY

Embodiments of the present invention provide a method and an apparatus for detecting an interface connection between devices, so as to solve a problem in the prior art that mixed insertion easily occurs on a plurality of interfaces.

The technical solutions provided in the embodiments of the present invention are as follows.

According to one aspect, an embodiment of the present invention provides a method for detecting an interface connection between devices, where the devices include a first device and a second device that communicates with each other, the first device includes a first interface, the second device includes a second interface, and the first interface and the second interface are connected by using a cable to communicate with each other. The method includes setting a recommended working parameter of the first interface as a first working parameter, obtaining, by using an auto negotiation operation, a second working parameter of the second interface, where the second working parameter is a recommended working parameter of the second interface that is set in the second device, and is sent to the first device after the second device initiates auto negotiation; and determining whether the obtained second working parameter is equal to the first working parameter, if the obtained second working parameter is not equal to the first working parameter, sending an alarm to indicate that a connection is unmatched; and if the obtained second working parameter is equal to the first working parameter, setting the recommended working parameter of the first interface as a third working parameter, and sending, by using an auto negotiation operation, the third working parameter to the second interface, so that the second device receives the third working parameter through the second interface; and receiving the third working parameter sent by the second device through the second interface, so as to complete auto negotiation between the first interface and the second interface, so that the first interface communicates with the second interface by using the third working parameter, where the third working parameter of the second interface is sent after the second device obtains the first working parameter of the first interface by using the auto negotiation operation, determines that the first working parameter is equal to the second working parameter, and sets a recommended working parameter of the second interface as the third working parameter.

In a first possible implementation manner, the first device and the second device separately include at least one interface group, where each one in the at least one interface group includes at least one interface, and recommended working parameters of each interface in a same interface group of a same device are the same; when there is a plurality of interface groups, recommended working parameters of each interface in different interface groups of a same device are different.

With reference to the first possible implementation manner, in a second possible implementation manner, the first interface and the second interface are Ethernet interfaces.

With reference to the second possible implementation manner, in a third possible implementation manner, the parameters include at least one of the following three parameters or any combination of the following three parameters: a rate, a duplex state, and a flow control parameter.

With reference to the first possible implementation manner, in a fourth possible implementation manner, the first working parameter and the third working parameter are set in an auto negotiation advertisement register of a physical-layer chip on which the first interface is located, and the second working parameter and the third working parameter are set in an auto negotiation advertisement register of a physical layer chip on which the second interface is located; auto negotiation is separately set in link control registers of the physical layer chips on which the first interface and the second interface are located, the second working parameter is obtained in an auto negotiation link partner ability register of the physical layer chip on which the first interface is located, and the first working parameter is obtained in an auto negotiation link partner ability register of the physical layer chip on which the second interface is located; or, the third working parameter of the first interface is obtained in a link status register of the physical layer chip on which the first interface is located, and the third working parameter of the second interface is obtained in a link status register of the physical layer chip on which the second interface is located.

With reference to the fourth possible implementation manner, in a fifth possible implementation manner, the auto negotiation advertisement registers, the link control registers, the auto negotiation link partner ability registers, and the link status registers are all standard registers defined by the Institute of Electrical and Electronics Engineers (IEEE) 802.3 protocol.

With reference to the second possible implementation manner, in a sixth possible implementation manner, the first interface and the second interface are Peripheral Component Interconnect Express (PCIe) interfaces, Quickpath Interconnect (QPI) interfaces or RapidIO interfaces.

With reference to the sixth possible implementation manner, in a seventh possible implementation manner, the parameters include a rate and/or a bit width parameter.

With reference to the sixth possible implementation manner, in an eighth possible implementation manner, the first interface and the second interface are PCIe interfaces, the first working parameter and the third working parameter are set in a link control 2 register of the first interface, and the second working parameter and the third working parameter are set in a link control 2 register of the second interface; and the third working parameter of the first interface is obtained in a link status register of the first interface, and the third working parameter of the second interface is obtained in a link status register of the second interface.

With reference to any one of the first, the third, the fifth, the seventh and the eighth possible implementation manners, in a ninth possible implementation manner, the third working parameter is a working parameter supported by both the first interface and the second interface and with an optimal performance.

With reference to any one of the first, the third, the fifth, the seventh and the eighth possible implementation manners, in a tenth possible implementation manner, the operation of initiating auto negotiation automatically runs after the first device and the second device are powered on and reset; or the operation of initiating auto negotiation is executed under a control command.

With reference to any one of the first, the third, the fifth, the seventh and the eighth possible implementation manners, in an eleventh possible implementation manner, the cable includes an electric cable or an optical fiber.

According to another aspect, an embodiment of the present invention provides an apparatus for detecting an interface connection between devices, where the devices include a first device and a second device that communicates with each other, the first device includes a first interface, the second device includes a second interface, and the first interface and the second interface are connected by using a cable to communicate with each other. The method includes a setting module, configured to set a recommended working parameter of the first interface as a first working parameter; an obtaining module, configured to obtain, by using an auto negotiation operation, a second working parameter of the second interface, where the second working parameter is a recommended working parameter of the second interface that is set in the second device, and the second working parameter is sent to the first device after the second device initiates auto negotiation; and a determining module, configured to determine whether the obtained second working parameter is equal to the first working parameter; if the obtained second working parameter is not equal to the first working parameter, send an alarm to indicate that a connection is unmatched; and if the obtained second working parameter is equal to the first working parameter, set the recommended working parameter of the first interface as a third working parameter, and send, by using an auto negotiation operation, the third working parameter to the second interface, so that the second device receives the third working parameter through the second interface; and receive the third working parameter sent by the second device through the second interface, so as to complete auto negotiation between the first interface and the second interface, so that the first interface communicates with the second interface by using the third working parameter, where the third working parameter of the second interface is sent after the second device obtains the first working parameter of the first interface by using the auto negotiation operation, determines that the first working parameter is equal to the second working parameter, and sets a recommended working parameter of the second interface as the third working parameter.

In a thirteenth possible implementation manner, the first device and the second device separately include at least one interface group, where each one in the at least one interface group includes at least one interface, and recommended working parameters of each interface in a same interface group of a same device are the same; when there is a plurality of interface groups, recommended working parameters of each interface in different interface groups of a same device are different.

With reference to the thirteenth possible implementation manner, in a fourteenth possible implementation manner, the first interface and the second interface are Ethernet interfaces.

In a fifteenth possible implementation manner, the parameters include at least one of the following three parameters or any combination of the following three parameters: a rate, a duplex state, and a flow control parameter.

With reference to the fourteenth possible implementation manner, in a sixteenth possible implementation manner, the first working parameter and the third working parameter are set in an auto negotiation advertisement register of a physical layer chip on which the first interface is located, and the second working parameter and the third working parameter are set in an auto negotiation advertisement register of a physical layer chip on which the second interface is located; auto negotiation is separately set in link control registers of the physical layer chips on which the first interface and the second interface are located, the second working parameter is obtained in an auto negotiation link partner ability register of the physical layer chip on which the first interface is located, and the first working parameter is obtained in an auto negotiation link partner ability register of the physical layer chip on which the second interface is located; or, the third working parameter of the first interface is obtained in a link status register of the physical layer chip on which the first interface is located, and the third working parameter of the second interface is obtained in a link status register of the physical layer chip on which the second interface is located.

In a seventeenth possible implementation manner, the auto negotiation advertisement registers, the link control registers, the auto negotiation link partner ability registers, and the link status registers are all standard registers defined by the IEEE 802.3 protocol.

With reference to the thirteenth possible implementation manner, in an eighteenth possible implementation manner, the first interface and the second interface are PCIe interfaces, QPI interfaces or RapidIO interfaces.

In a nineteenth possible implementation manner, the parameters include a rate and/or a bit width parameter.

With reference to the eighteenth possible implementation manner, in a twentieth possible implementation manner, the first interface and the second interface are PCIe interfaces, the first working parameter and the third working parameter are set in a link control 2 register of the first interface, and the second working parameter and the third working parameter are set in a link control 2 register of the second interface; and the third working parameter of the first interface is obtained in a link status register of the first interface, and the third working parameter of the second interface is obtained in a link status register of the second interface.

With reference to any one of the thirteenth, the fifteenth, the seventeenth, the nineteenth and the twentieth possible implementation manners, in a twenty-first possible implementation manner, the third working parameter is a working parameter supported by both the first interface and the second interface and with an optimal performance.

With reference to any one of the thirteenth, the fifteenth, the seventeenth, the nineteenth and the twentieth possible implementation manners, in a twenty-second possible implementation manner, the operation of initiating auto negotiation automatically runs after the first device and the second device are powered on and reset; or the operation of initiating auto negotiation is executed under a control command.

With reference to any one of the thirteenth, the fifteenth, the seventeenth, the nineteenth and the twentieth possible implementation manners, in a twenty-third possible implementation manner, the cable includes an electric cable or an optical fiber.

In an embodiment of the present invention, whether a second working parameter obtained by a first interface is equal to a set first working parameter is determined, and a matching relationship between interfaces is further determined, thereby solving a problem in the prior art that mixed insertion easily occurs on interfaces, reducing an error probability of a manual operation, and improving maintainability and reliability of a communications device.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show some embodiments of the present invention, and a person of ordinary skill in the art may still derive other drawings from these accompanying drawings without creative efforts.

DESCRIPTION OF EMBODIMENTS

The prior art has a problem that mixed insertion easily occurs on a plurality of interfaces. To address such a defect and ensure reliable communication between communications devices and maintainability of the communications device, the embodiments of the present invention provide a method for detecting an interface connection.

The following describes a main implementation principle, specific implementation manners, and corresponding achievable benefits of the technical solutions provided in the embodiments of the present invention with reference to the accompanying drawings.

Figure 2:
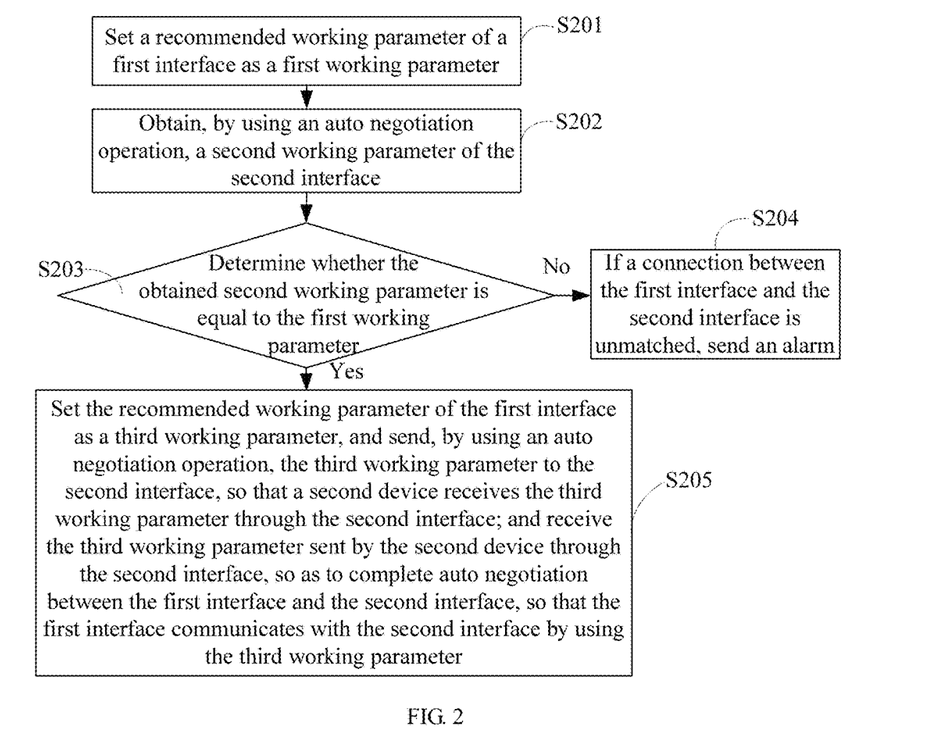
FIG. 2 is a flowchart of a main implementation principle according to an embodiment of the present invention.

As shown in FIG. 2, a process of a main implementation principle of a method for detecting an interface connection between devices of an embodiment of the present invention is as follows.

In the embodiment, the devices include a first device and a second device that communicate with each other, where the first device includes a first interface, the second device includes a second interface, and the first interface and the second interface are connected by using a cable to communicate with each other. The method includes:

Step S201: Set a recommended working parameter of the first interface as a first working parameter.

Step S202: Obtain, by using an auto negotiation operation, a second working parameter of the second interface, where the second working parameter is a recommended working parameter of the second interface that is set in the second device, and the second working parameter is sent to the first device after the second device initiates auto negotiation.

Step S203: Determine whether the obtained second working parameter is equal to the first working parameter.

If the obtained second working parameter is not equal to the first working parameter, step S204 is executed; and if the obtained second working parameter is equal to the first working parameter, step S205 is executed.

Step S204: Send an alarm to indicate that a connection is unmatched.

Step S205: Set the recommended working parameter of the first interface as a third working parameter, and send, by using an auto negotiation operation, the third working parameter to the second interface, so that the second device receives the third working parameter through the second interface; and receive the third working parameter sent by the second device through the second interface, so as to complete auto negotiation between the first interface and the second interface, so that the first interface communicates with the second interface by using the third working parameter, where the third working parameter of the second interface is sent after the second device obtains the first working parameter of the first interface by using the auto negotiation operation, determines that the first working parameter is equal to the second working parameter, and sets a recommended working parameter of the second interface as the third working parameter.

In an embodiment of the present invention, whether a second working parameter obtained by a first interface is equal to a set first working parameter is determined, and a matching relationship between interfaces is further determined, thereby solving a problem in the prior art that mixed insertion easily occurs on interfaces, reducing an error probability of a manual operation, and improving maintainability and reliability of a communications device.

The following gives a detailed explanation and instruction of a main implementation principle of the method by describing an embodiment according to the foregoing invention principle in the present invention.

Embodiment 1

Figure 3:
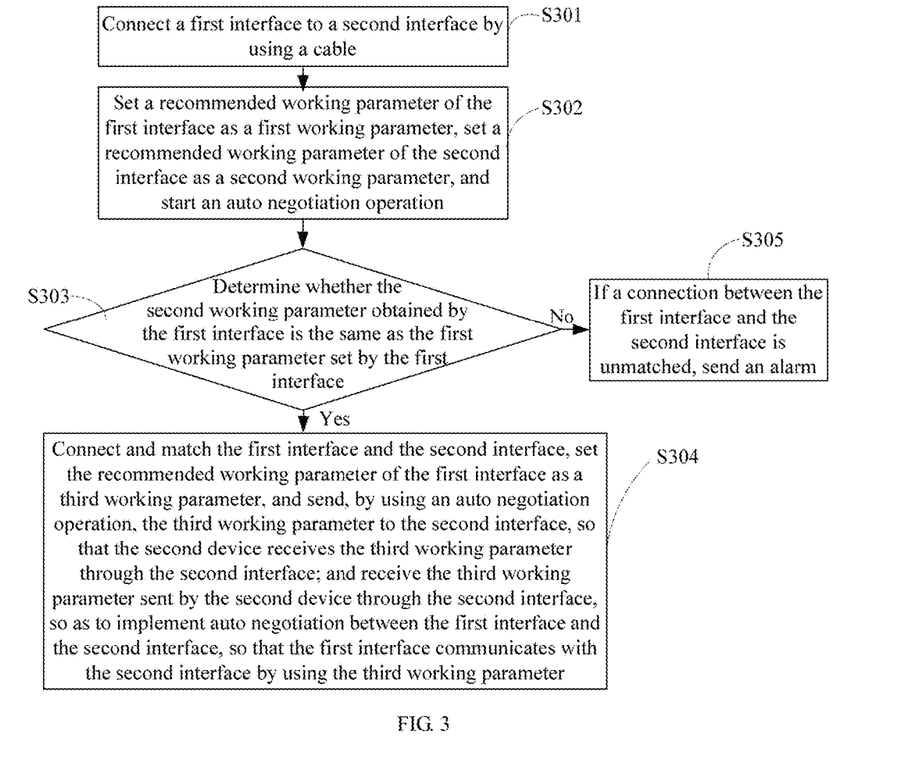
FIG. 3 is a flowchart of a method for detecting an interface connection between devices according to Embodiment 1 of the present invention.

Referring to FIG. 3, FIG. 3 is a flowchart of a method for detecting an interface connection between devices of an embodiment of the present invention. The method specifically includes the following.

The embodiment is described based on an Ethernet interface, and interface working parameters supported by the Ethernet include at least one parameter of a rate, a duplex state, and a flow control parameter. The rate includes 10 Megabit (10M), 100M, 1000M and 10 Gigabit (10G); the duplex state includes a half duplex state and a full duplex state, and the flow control parameter includes a full duplex flow control and an unsupported flow control. For example, interface working parameters supported by the Ethernet include but are not limited to 10M and a half duplex state working mode; 100M and a full duplex state working mode; 1000M and a half duplex state working mode; and 100M and a full duplex flow control working mode.

In the embodiment, devices include a first device and a second device that communicate with each other, where the first device and the second device separately include one interface group, the interface group includes one interface, and a first interface in the first device is paired with a second interface in the second device. The method includes:

Step S301: Connect a first interface to a second interface by using a cable.

The number of the first interface is GE11, and the number of the second interface is GE21; a GE11 interface and a GE21 interface are connected by using a cable. The cable includes but is not limited to an optical fiber, an electric cable or other communication transmission media.

Step S302: Set a recommended working parameter of the first interface GE11 as a first working parameter, and set a recommended working parameter of the second interface as a second working parameter. Separately set working parameters of the first interface and the second interface to auto negotiation, initiate an auto negotiation operation, and send, in a process of auto negotiation, the second working parameter of the second interface to the first interface of the first device.

Auto negotiation on working parameters of the GE11 interface and the GE21 interface is performed, and in a process of auto negotiation, recommended working parameters are set as different parameters according to a correspondence between network ports; if GE11 and GE21 are matched interfaces, the first working interface and the second working parameter are set to be the a same, and otherwise, the first working interface and the second working parameter are set to be different. The auto negotiation includes mutual exchange of working parameters supported by the GE11 interface and the GE21 interface, and a parameter supported by both the GE11 interface and the GE21 interface and with an optimal performance is chosen as an actual working parameter. A rate, a duplex and a flow control and other working modes are different with each other, and therefore, one party first needs to transfer its own recommended working parameter to the other party, and receives a recommended working parameter sent from the other party, a parameter accepted by both parties and with an optimal performance is chosen from the recommended working parameters, and both parties agree to perform communication according to the parameter. The first working parameter is set to 100M and full duplex, and the second working parameter is set to 100M and full duplex.

Step S303: After the auto negotiation is complete, determine whether the second working parameter obtained by the first interface is the same as the first working parameter set by the first interface; if the obtained second working parameter is equal to the first working parameter, step S304 is executed, and otherwise, step S305 is executed.

Step S304: Connect and match the first interface and the second interface, set the recommended working parameter of the first interface as a third working parameter, and send, by using an auto negotiation operation, the third working parameter to the second interface, so that the second device receives the third working parameter through the second interface; and receive the third working parameter sent by the second device through the second interface, so as to complete auto negotiation between the first interface and the second interface, so that the first interface communicates with the second interface by using the third working parameter, where the third working parameter of the second interface is sent after the second device obtains the first working parameter of the first interface by using the auto negotiation operation, determines that the first working parameter is equal to the second working parameter, and sets a recommended working parameter of the second interface as the third working parameter.

When the first interface is correctly connected to the second interface, to prevent a normal service from being affected due to a performance problem, the third working parameter may also be set for the first interface and the second interface, and an auto negotiation operation is initiated again, where the third working parameter is a working mode supported by both the first interface and the second interface and with an optimal performance. In the embodiment, the recommended working parameters of the GE11 interface and the GE21 interface may separately be modified to 1000M and full duplex, and then auto negotiation is initiated again by using a link control register of a physical layer chip, and the GE11 interface and the GE21 interface may work in parameters of 1000M and full duplex after the auto negotiation is complete. The link control register is also a standard register defined by the Ethernet 802.3 protocol.

Step S305: If a connection between the first interface and the second interface is unmatched, send an alarm.

When a connection error is discovered, alarming is automatically performed to instruct an operator to adjust a cable insertion position of an interface and perform reconnection, and continue with detection according to the foregoing detection steps.

The auto negotiation may be automatically executed after the first device and the second device are powered on or reset, or may be executed when a network port is reconnected after being disconnected; or may also be executed under a control command.

In the embodiment, the GE11 and the GE21 are matched network ports, and therefore, both of recommended working parameters may be 100M and full duplex, and auto negotiation parameters are separately set in link control registers of the first interface and the second interface; the first working parameter is set in an auto negotiation advertisement register of a physical layer chip on which the first interface is located, and the second working parameter is set in an auto negotiation advertisement register of a physical layer chip on which the second interface is located; the second working parameter is obtained in an auto negotiation link partner ability register of the physical layer chip on which the first interface is located, and the first working parameter is obtained in an auto negotiation link partner ability register of the physical layer chip on which the second interface is located; or, a third working parameter of the first interface is obtained in a link status register of the physical layer chip on which the first interface is located. It should be noted that, a working parameter state is obtained from the link status register after negotiation is complete and may be used to determine whether a current state conforms to a recommended working mode of the interface of the device on which the link status register is located. For example, after the third working parameter is set, that whether a normal operation is performed according to the parameter is determined.

A third working parameter of the second interface is read from a link status register of the physical layer chip on which the second interface is located. It should be noted that, when whether a recommended working parameter of the first interface is consistent with a recommended working parameter of the second interface is determined, a working parameter obtained from the link status register after a negotiation is complete may be compared with a recommended working parameter set in an auto negotiation advertisement register. If the two working parameters are consistent, it indicates that the first interface matches the second interface; if the two working parameters are inconsistent, it indicates that the first interface does not match the second interface.

Embodiment 2

In the embodiment, interfaces on a first device and a second device are separately divided into a plurality of groups according to functions. For example, eight network ports of the first device are divided into two groups, and mixed insertion may be randomly performed on four network ports in each group, but mixed insertion of network ports between the two groups is not allowed. Similarly, eight network ports of the second device are divided into two groups, and mixed insertion may be randomly performed on four network ports in each group but mixed insertion of network ports between the two groups is not allowed. In this case, recommended working parameters of four network ports in a same group may be set to a same rate and duplex state, whereas working parameters in different groups are different. As long as a network cable connects two interfaces of different groups on the first device and the second device, it can be detected and an alarm is sent.

Embodiment 3

The embodiment is described based on a PCIe, a QPI interface or a RapidIO interface. The PCIe is a high-performance communication link interface used on a personal computer and a server, and the PCIe not only can implement an interconnection between two components on a board, but also can interconnect two devices by using an electric cable. For example, both a server and a flash storage array provide PCIe interfaces, and the server can be interconnected to the flash storage array by using a PCIe electric cable.

A working mode supported by the PCIe protocol includes but is not limited to a bit width parameter and/or a rate, where the bit width may be 1×, 2×, 4×, 8×, 12×, 16× or 32×, and the rate supports 2.5G, 5G or 8G, and a plurality of combinations is supported.

In the embodiment, a first working parameter is set in a link control 2 register of a first interface, and a second working parameter is set in a link control 2 register of a second interface; auto negotiation is separately initiated in link control registers of the first interface and the second interface; an actual working parameter of the first interface is read from a link status register of the first interface and is compared with the first working parameter, and an actual working parameter of the second interface is read from a link status register of the second interface and is compared with the second working parameter.

When the actual working parameter of the first interface and the actual working parameter of the second interface are respectively the same as the first working parameter and the second working parameter, it is determined that a connection is correct, a third working parameter is set in the link control 2 registers of the first interface and the second interface, auto negotiation is initiated again, and both the first interface and the second interface work according to the third working parameter after the auto negotiation is complete. In this case, the third working parameter of the first interface and the second interface may be read from the link status registers, and whether the first interface and the second interface work according to the set third working parameter is determined.

It should be noted that, the QPI and the RapidIO are other two high-speed link interfaces, also support a plurality of rates and bit widths and obtain an optimal working mode supported by the two links by using an auto negotiation mechanism. Therefore, a method similar to the PCIe may be adopted to detect a situation of mixed insertion, which is not repeatedly described herein.

Embodiment 4

Figure 4:
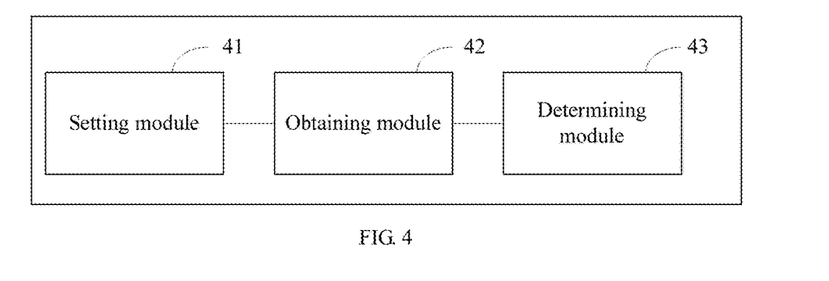
FIG. 4 is a schematic diagram of an apparatus for detecting an interface connection between devices according to an embodiment of the present invention.

As shown in FIG. 4, in the present invention, an Ethernet interface is used as an example, and an apparatus for detecting an interface connection between devices is further provided. A working mode includes at least one of the following three parameters: a rate, a duplex state and a flow control parameter.

The devices include a first device and a second device that communicate with each other, where the first device includes a first interface, the second device includes a second interface, and the first interface and the second interface are connected by using a cable to communicate with each other. The apparatus includes a setting module 41, configured to set a recommended working parameter of the first interface as a first working parameter; an obtaining module 42, configured to obtain, by using an auto negotiation operation, a second working parameter of the second interface, where the second working parameter is a recommended working parameter of the second interface that is set in the second device, and is sent to the first device after the second device initiates auto negotiation; and a determining module 43, configured to determine whether the obtained second working parameter is equal to the first working parameter; if the obtained second working parameter is not equal to the first working parameter, send an alarm to indicate that a connection is unmatched; and if the obtained second working parameter is equal to the first working parameter, set the recommended working parameter of the first interface as a third working parameter, and send, by using an auto negotiation operation, the third working parameter to the second interface, so that the second device receives the third working parameter through the second interface; and receive the third working parameter sent by the second device through the second interface, so as to complete auto negotiation between the first interface and the second interface, so that the first interface communicates with the second interface by using the third working parameter, where the third working parameter of the second interface is sent after the second device obtains the first working parameter of the first interface by using the auto negotiation operation, determines that the first working parameter is equal to the second working parameter, and sets a recommended working parameter of the second interface as the third working parameter.

The first device and the second device separately include at least one interface group, where each one in the at least one interface group includes at least one interface, and recommended working parameters of each interface in a same interface group of a same device are the same; when there is a plurality of interface groups, recommended working parameters of each interface in different interface groups of a same device are different.

The first working parameter and the third working parameter are set in an auto negotiation advertisement register of a physical layer chip on which the first interface is located, and the second working parameter and the third working parameter are set in an auto negotiation advertisement register of a physical layer chip on which the second interface is located; auto negotiation is separately set in link control registers of the physical layer chips on which the first interface and the second interface are located, the second working parameter is obtained in an auto negotiation link partner ability register of the physical layer chip on which the first interface is located, and the first working parameter is obtained in an auto negotiation link partner ability register of the physical layer chip on which the second interface is located; or, the third working parameter of the first interface is obtained in a link status register of the physical layer chip on which the first interface is located, and the third working parameter of the second interface is obtained in a link status register of the physical layer chip on which the second interface is located.

The auto negotiation advertisement registers, the link control registers, the auto negotiation link partner ability registers, and the link status registers are all standard registers defined by the IEEE 802.3 protocol.

In addition, the first interface and the second interface may also be PCIe interfaces, QPI interfaces or RapidIO interfaces, and the parameters include a rate and/or a bit width parameter.

The first interface and the second interface are PCIe interfaces, the first working parameter and the third working parameter are set in a link control 2 register of the first interface, and the second working parameter and the third working parameter are set in a link control 2 register of the second interface; an auto negotiation parameter is separately set in link control registers of the first interface and the second interface; and the third working parameter of the first interface is obtained in a link status register of the first interface, and the third working parameter of the second interface is obtained in a link status register of the second interface.

Persons of ordinary skill in the art should understand that each aspect of the present invention or each possible implementation manner of each aspect may be specifically implemented as systems, methods, or computer program products. Therefore, each aspect of the present invention or each possible implementation manner of each aspect may adopt forms of complete hardware embodiments, complete software embodiments (including firmware, resident software, and the like), or embodiments combining software and hardware, which are uniformly referred to as "circuit", "module", or "system" herein. In addition, each aspect of the present invention or each possible implementation manner of each aspect may adopt forms of computer program products. Computer program products refer to computer readable program codes stored in a computer readable medium.

A computer readable medium may be a computer readable signal medium or a computer readable storage medium. The computer readable storage medium includes but is not limited to electronic, magnetic, optical, electromagnetic, infrared, or semiconductor systems, devices, or apparatuses, or any appropriate combination of the foregoing items, such as a random access memory (RAM), a read-only memory (ROM), an erasable programmable read-only memory (EPROM) or flash memory, a fiber, and a portable compact disc read-only memory (CD-ROM).

Processors in computers read computer readable program codes stored in a computer readable medium, so that the processors can execute functions and actions specified in one step or multiple steps in the flowcharts, and an apparatus is generated to implement functions and actions specified in one block or multiple blocks in the block diagrams.

Computer readable program codes can be completely executed on user computers, partially executed on user computers, used as separate software packages, partially on user computers and partially on remote computers, or completely executed on remote computers or servers. It should also be noted that in certain alternative implementation solutions, functions denoted in each step of the flowcharts or in each block of the block diagrams may not occur according to the sequence denoted in the diagrams. For example, depending on the involved functions, two steps or two blocks successively marked may be performed concurrently, or these blocks sometimes may be performed in a reverse order.

Those skilled in the art may make modifications and variations to the invention without departing from the spirit and scope of the invention. The invention is intended to cover the modifications and variations provided that they fall within the scope of the claims in the present invention or their equivalent technologies.

What is claimed is:

1. A method for detecting an interface connection between a first device and a second device, wherein the first device comprises a first interface, wherein the second device comprises a second interface, wherein the first interface and the second interface are connected by a cable, and wherein the method comprises:
    setting a recommended working parameter of the first interface as a first working parameter;
    obtaining, from an auto negotiation operation with the second device, a second working parameter of the second interface, wherein the second working parameter is a recommended working parameter of the second interface;
    determining whether the second working parameter is equal to the first working parameter;
    sending an alarm indicating that a connection is unmatched when the second working parameter is not equal to the first working parameter;
    setting a third working parameter equal to the first working parameter when the second working parameter is equal to the first working parameter;
    sending, via the auto negotiation operation, the third working parameter to the second interface when the second working parameter is equal to the first working parameter; and
    communicating with the second interface by using the third working parameter,
    wherein the first device and the second device separately comprise at least one interface group,
    wherein each one in the at least one interface group comprises at least one interface, and
    wherein recommended working parameters of each interface in a same interface group of a same device are the same, and wherein recommended working parameters of each interface in different interface groups of a same device are different when there is a plurality of interface groups in the same device.

2. The method of claim 1, wherein the first interface and the second interface are Ethernet interfaces, and wherein the first working parameter, the second working parameter, and the third working parameter comprise at least one of the following: a rate, a duplex state, or a flow control parameter.

3. The method of claim 1, wherein the first working parameter and the third working parameter are set in an auto negotiation advertisement register of a physical layer chip on which the first interface is located, wherein the second working parameter and the third working parameter are set in an auto negotiation advertisement register of a physical layer chip on which the second interface is located, wherein auto negotiation is separately set in link control registers of the physical layer chips on which the first interface and the second interface are located, wherein the second working parameter is obtained in an auto negotiation link partner ability register of the physical layer chip on which the first interface is located, wherein the first working parameter is obtained in an auto negotiation link partner ability register of the physical layer chip on which the second interface is located, and wherein the auto negotiation advertisement registers, the link control registers, and the auto negotiation link partner ability registers are standard registers defined by IEEE 802.3.

4. The method of claim 1, wherein the third working parameter of the first interface is obtained in a link status register of the physical layer chip on which the first interface is located, wherein the third working parameter of the second interface is obtained in a link status register of the physical layer chip on which the second interface is located, and wherein the link status registers are standard registers defined by IEEE 802.3.

5. The method of claim 1, wherein the first interface and the second interface are one of: Peripheral Component Interconnect Express (PCIe) interfaces, Quickpath Interconnect (QPI) interfaces, or RapidIO interfaces, and wherein the first working parameter, the second working parameter, and the third working parameter comprise at least one of: a rate, or a bit width parameter.

6. The method of claim 5, wherein the first interface and the second interface are PCIe interfaces, wherein the first working parameter and the third working parameter are set in a link control 2 register of the first interface, wherein the second working parameter and the third working parameter are set in a link control 2 register of the second interface, wherein the third working parameter of the first interface is obtained in a link status register of the first interface, and wherein the third working parameter of the second interface is obtained in a link status register of the second interface.

7. The method of claim 1, wherein the third working parameter is a working parameter supported by both the first interface and the second interface and with an optimal performance.

8. The method of claim 1, wherein an operation of initiating auto negotiation automatically runs after the first device and the second device are powered on and reset.

9. The method according to claim 1, wherein an operation of initiating the auto negotiation operation is executed in response to a control command.

10. An apparatus comprising:
    a first interface;
    a processor coupled to the first interface, wherein the processor is configured to:
        set a recommended working parameter of the first interface as a first working parameter;
        obtain, from an auto negotiation operation, a second working parameter from a second interface, wherein the second working parameter is a recommended working parameter of the second interface; and
        determine whether the second working parameter is equal to the first working parameter;
        send an alarm to indicate that a connection is unmatched when the second working parameter is not equal to the first working parameter;
        set a third working parameter equal to the first working parameter when the second working parameter is equal to the first working parameter;
        send, via the auto negotiation operation, the third working parameter to the second interface; and
        communicate with the second interface by using the third working parameter,
    wherein the first device and the second device separately comprise at least one interface group,
    wherein each one in the at least one interface group comprises at least one interface, and
    wherein recommended working parameters of each interface in a same interface group of a same device are the same, and wherein recommended working parameters of each interface in different interface groups of a same device are different when there is a plurality of interface groups in the same device.

11. The apparatus of claim 10, wherein the first interface and the second interface are Ethernet interfaces, and wherein the first working parameter, the second working parameter, and the third working parameter comprise at least one of: a rate, a duplex state, or a flow control parameter.

12. The apparatus of claim 10, wherein the first working parameter and the third working parameter are set in an auto negotiation advertisement register of a physical layer chip on which the first interface is located, wherein the second working parameter and the third working parameter are set in an auto negotiation advertisement register of a physical layer chip on which the second interface is located, wherein auto negotiation is separately set in link control registers of the physical layer chips on which the first interface and the second interface are located, wherein the second working parameter is obtained in an auto negotiation link partner ability register of the physical layer chip on which the first interface is located, and wherein the first working parameter is obtained in an auto negotiation link partner ability register of the physical layer chip on which the second interface is located, and wherein the auto negotiation advertisement registers, the link control registers, and the auto negotiation link partner ability registers are standard registers defined by IEEE 802.3.

13. The apparatus of claim 10, wherein the third working parameter of the first interface is obtained in a link status register of the physical layer chip on which the first interface is located, and wherein the third working parameter of the second interface is obtained in a link status register of the physical layer chip on which the second interface is located, wherein the link status registers are standard registers defined by IEEE 802.

14. The apparatus of claim 10, wherein the first interface and the second interface are one of: Peripheral Component Interconnect Express (PCIe) interfaces, Quickpath Interconnect (QPI) interfaces or RapidIO interfaces, and wherein the first working parameter, the second working parameter, and the third working parameter comprise at least one of: a rate or a bit width parameter.

15. The apparatus of claim 14, wherein the first interface and the second interface are PCIe interfaces, wherein the first working parameter and the third working parameter are set in a link control 2 register of the first interface, wherein the second working parameter and the third working parameter are set in a link control 2 register of the second interface, wherein the third working parameter of the first interface is obtained in a link status register of the first interface, and wherein the third working parameter of the second interface is obtained in a link status register of the second interface.

16. The apparatus of claim 10, wherein the third working parameter is a working parameter supported by both the first interface and the second interface and with an optimal performance.

17. The apparatus of claim 10, wherein an operation of initiating auto negotiation automatically runs after the first device and the second device are powered on and reset.

18. The apparatus of claim 10, wherein an operation of initiating auto negotiation is executed in response to a control command.

19. A method for detecting an interface connection between a first device and a second device, wherein the first device comprises a first interface, wherein the second device comprises a second interface, wherein the first interface and the second interface are connected by a cable, and wherein the method comprises:
  setting a recommended working parameter of the first interface as a first working parameter;
  obtaining, from an auto negotiation operation with the second device, a second working parameter of the second interface, wherein the second working parameter is a recommended working parameter of the second interface;
  determining whether the second working parameter is equal to the first working parameter;
  sending an alarm indicating that a connection is unmatched when the second working parameter is not equal to the first working parameter;
  setting a third working parameter equal to the first working parameter when the second working parameter is equal to the first working parameter;
  sending, via the auto negotiation operation, the third working parameter to the second interface when the second working parameter is equal to the first working parameter; and
  communicating with the second interface by using the third working parameter,
  wherein the first working parameter, the second working parameter, and the third working parameter comprise at least one of: a rate, or a bit width parameter, and
  wherein the first interface and the second interface are PCIe interfaces,
  wherein the first working parameter and the third working parameter are set in a link control 2 register of the first interface,
  wherein the second working parameter and the third working parameter are set in a link control 2 register of the second interface,
  wherein the third working parameter of the first interface is obtained in a link status register of the first interface, and
  wherein the third working parameter of the second interface is obtained in a link status register of the second interface.

* * * * *